United States Patent
Blascok et al.

(10) Patent No.: US 6,915,718 B2
(45) Date of Patent: Jul. 12, 2005

(54) SELECTOR HANDLE IN A MOTOR VEHICLE

(75) Inventors: Bohuslav Blascok, Dassel (DE); Axel Wack, Einbeck (DE)

(73) Assignee: United Parts FHS Automobil Systeme GmbH, Dassel (DE)

( * ) Notice: Subject to any disclaimer, the term of this patent is extended or adjusted under 35 U.S.C. 154(b) by 217 days.

(21) Appl. No.: 10/318,874

(22) Filed: Dec. 13, 2002

(65) Prior Publication Data

US 2003/0233903 A1 Dec. 25, 2003

Related U.S. Application Data

(63) Continuation-in-part of application No. 09/650,556, filed on Aug. 30, 2000, now abandoned.

(30) Foreign Application Priority Data

Sep. 2, 1999 (DE) .......................................... 199 41 796

(51) Int. Cl.⁷ ........................... B60K 20/00; G05G 1/04; G05G 5/06
(52) U.S. Cl. ........................... 74/538; 74/473.3; 74/519; 74/525; 74/537
(58) Field of Search ............................... 74/423, 473.23, 74/473.3, 525, 522.5, 493, 520, 529, 519, 537

(56) References Cited

U.S. PATENT DOCUMENTS

| 4,565,151 A | * | 1/1986 | Buma ........................ 116/28.1 |
| 4,774,850 A | * | 10/1988 | Shovlin .................... 74/473.23 |
| 5,179,870 A | * | 1/1993 | Behrens et al. ............. 74/473.3 |
| 5,617,760 A | * | 4/1997 | Woeste et al. ........... 74/473.23 |
| 6,601,469 B1 | * | 8/2003 | Giefer et al. ................. 74/537 |

FOREIGN PATENT DOCUMENTS

| DE | 43 42 460 | 6/1994 |
| DE | 44 34 135 | 3/1996 |

* cited by examiner

*Primary Examiner*—David A. Bucci
*Assistant Examiner*—Colby Hansen
(74) *Attorney, Agent, or Firm*—Cohen, Pontani, Lieberman & Pavane

(57) ABSTRACT

A selector lever for automatic transmission for an automobile has an automatic selector handle in which the horizontal movement of the push button into the housing is transmitted to the rod by means of a deflecting lever which is swivelable around a cylindrical pin. A support lever is connected with the rod by a cylindrical pin. The support lever is supported at the housing and its movement is limited by a distance element.

6 Claims, 4 Drawing Sheets

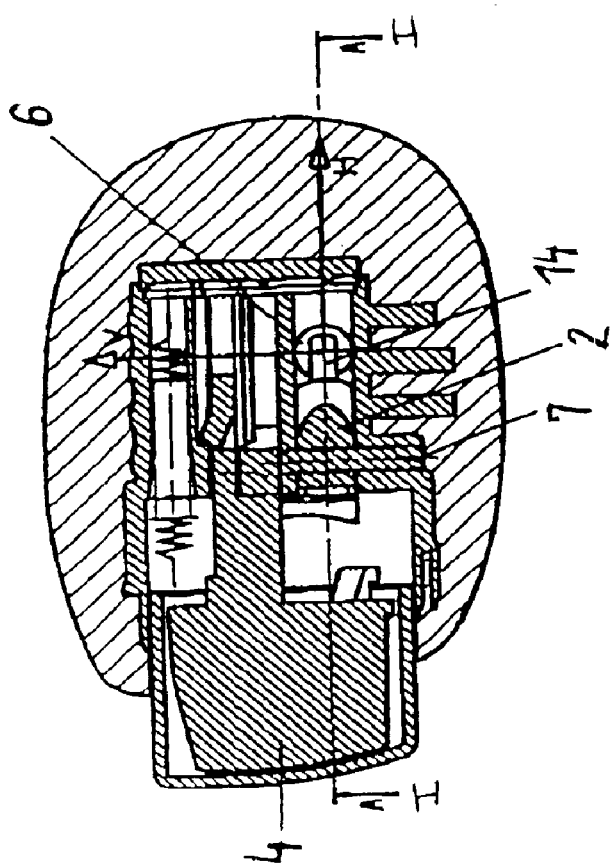
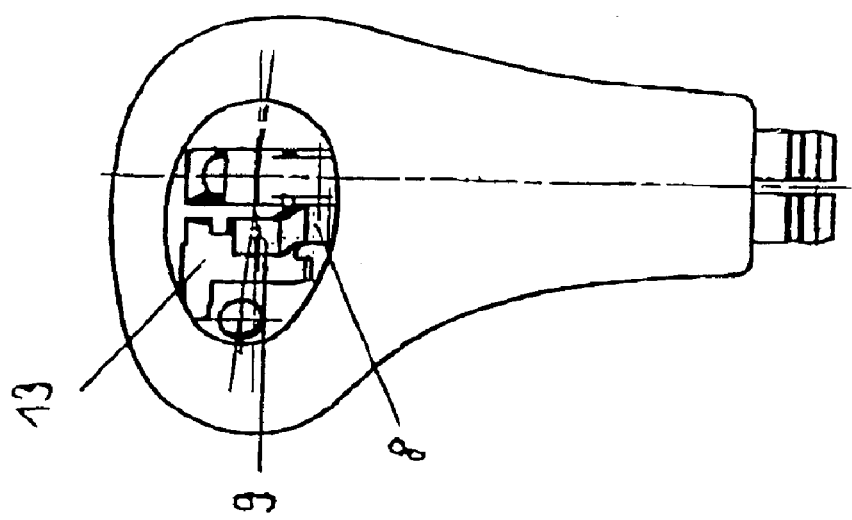

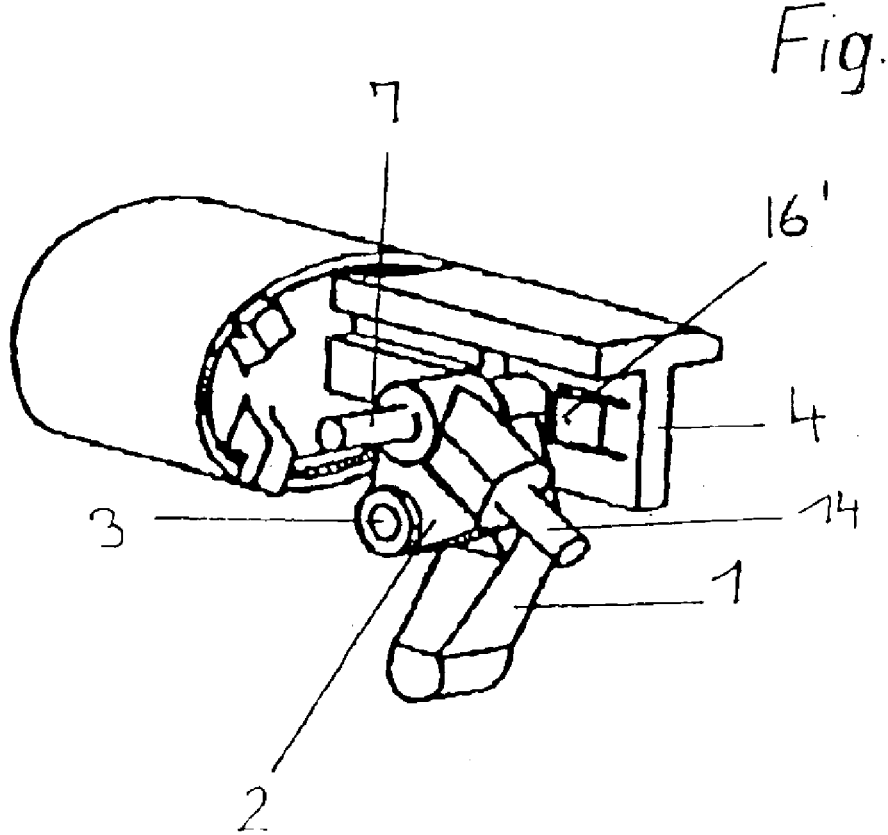
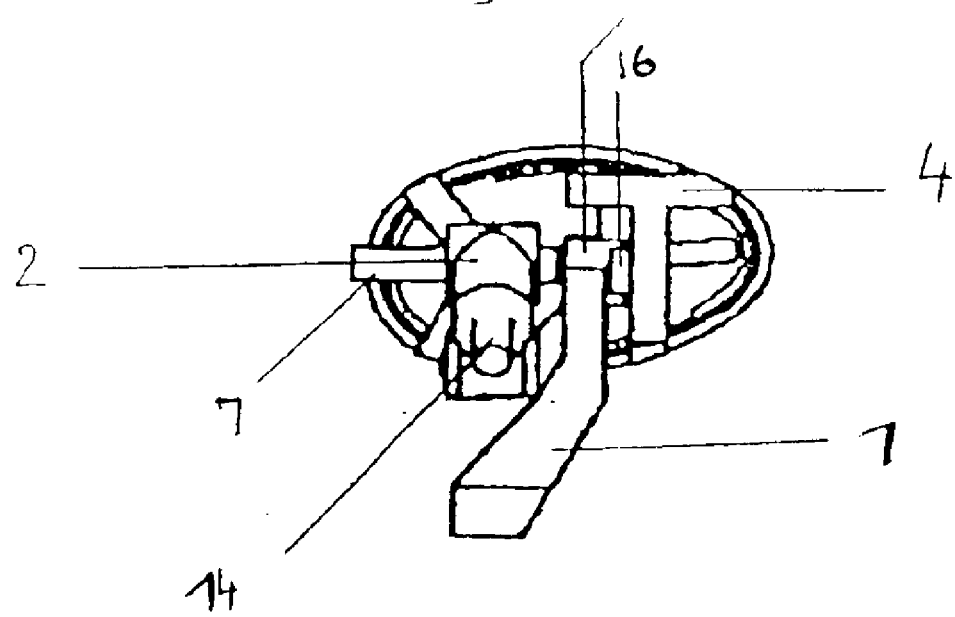

SELECTOR HANDLE IN A MOTOR VEHICLE

CROSS REFERENCE TO RELATED APPLICATIONS

This application is a Continuation-in-Part of U.S. patent application Ser. No. 09/650,556, filed Aug. 30, 2000 now abandoned, which claims priority from Applications filed in Germany on Sep. 2, 1999, No. 199 41 796.2. The disclosure of U.S. patent application Ser. No. 09/650,556 is incorporated herein by reference.

FIELD OF THE INVENTION

The present invention is directed to a selector handle with a push mechanism for actuating a rod arranged in the selector lever and connected to an automobile transmission. The push button mechanism is movable in the selector handle transverse to the selector lever and its movement is transmitted to the rod by means of a type of angle lever having a lever arm.

The present invention is applicable for selector handles in automatic gear shifts in motor vehicles in which it is required to deflect the movement of a button of the selector handle and transmit it to the transmission of an automobile by means of a tie rod thereby permitting a fast and simple assembly and disassembly of the selector handle particularly onto tie rods having an elongated opening for engagement with a pin shaped connection of the deflecting lever.

BACKGROUND OF THE INVENTION

In motor vehicles with automatic gear shifting, a gear shift handle or selector handle by which the desired gear is adjusted is generally arranged on the control panel or console of the motor vehicle. To carry out the selection process, a button is arranged in the selector handle. The driver of the motor vehicle presses this button into the automatic selector handle with his fingers, which makes it possible to shift from one gear to another gear. For this purpose, a tie rod is located in the selector handle for transmitting the movement of the button to the automatic transmission. However, when the button projects horizontally in the automatic selector handle, the movement of the button must be transmitted or deflected to the transmission mechanism arranged vertically in the selector handle. Sloping surfaces at the end of the button or tie rod are used for this purpose. Intermediate mechanisms which deflect and transmit the force from the button to the tie rod by 90° due to the inclined planes are also common. This is disadvantageous in that there are parts which are subject to wear and which must be replaced or serviced, require a certain installation space and cannot be disassembled in every selection position without damaging the tie rod.

DE 44 34 135 A1 discloses a shift lever for a motor vehicle transmission in which the shift handle is fitted to the shift lever rod and held with catches. A lever mechanism whose end projects into a catch rod is moved up and down by a push button. This mechanism can not be used in all selector handles or in all shifting positions that are predetermined by the automobile manufacturer. The assembly and therefore also the disassembly of this mechanism is complicated.

DE 44 27 695 discloses a gear shift handle for automobile transmissions including a selector handle having a push mechanism wherein two meshing cog or gear wheels which are mounted on separate axles affect a transformation of the movement of the push button onto a selector rod. Disadvantageous in this device is that the assembly and disassembly of the individual parts of the selector handle and of the selector handle onto the selector rod requires great efforts.

DE 195 13 809 C1 discloses a shift lever for an automatic automobile transmission wherein the linear movement of a push button is transformed via tooth-shaped elements into an axial movement of a tie rod. Likewise, this device has the disadvantage that the shift lever cannot be assembled onto the tie rod in any desired position in a simple and expedient manner.

The assembly and disassembly of the known selector handles onto the selector lever in any chosen position of the pull or tie rod, if at all possible, can only be achieved under increased wear or to damage to the tie rod.

Therefore, it is the object of the present invention to provide a device which overcomes the disadvantages of the prior art and comprises a selector handle, wherein such assembly and disassembly is possible in every selector position without damage to the tie rod and with a low expenditure of force, low friction and low wear.

SUMMARY OF THE INVENTION

This and other objects are met by a selector handle having a push button for actuating a tie rod which has a recess and which is disposed within the housing, a support lever having an end supported by the housing and an opposite end adapted for engagement with a suitable drive member of the push button, a deflecting lever movable about a pivot within the housing, a joint including a cylinder pin between the support lever and the deflecting lever and wherein the push button is disposed for acting against the upper portion of the support lever for moving the tie rod.

Thus, the present invention provides a selector handle with a push mechanism which is easily connectable to a shift lever of a motor vehicle for shifting into the selected shifting positions, by inserting a pin-shaped elongation or connection that is attached to the deflecting lever into a recess in the tie rod. This can be achieved in various positions of the tie rod because the deflecting lever is mounted to a support lever at a pivot or joint that is movable by the push button and due to its pin-shaped connection which is preferably elastic. The transmission of force of the push button is carried out in such a way that a driver member of the push button of the automatic selector handle acts against an upper portion of a support lever which is swivelable about a fastening of a deflecting lever. A cylindrical pin in the housing or in a part of the housing serves as the fastening and pivot point of the deflecting lever.

The joint between the support lever and the deflecting lever is likewise advantageously formed of a cylindrical pin and is moveable toward the tie rod and around cylindrical pin 7 when the push button is pushed into the selector handle.

Preferably, the movement of the push button is transmitted to the joint between the support lever and deflecting lever by means of a suitable element, for example, a T-shaped element having a driver member. The driver member transmits this movement to the movable joint. When the joint between the support lever and deflecting lever is moved in the direction of the tie rod by a driver member, the deflecting lever tilts around the cylindrical pin and lifts up the tie rod.

The movable joint between the supporting lever and the deflecting lever is advantageously arranged below the cylindrical pin in the housing which serves as the pivot for the deflecting lever. The lower portion of the support lever, which is an elongated, preferably round part, is supported in a loose connection against the housing. The movement of the deflecting lever is limited, on the upper end by the housing and, on the lower end by the distance piece disposed between the tie rod and the deflecting lever.

For minimal wear at the part of the support lever that is not attached, the latter is advantageously spherical or rounded. The support lever can be constructed as a plastic part or can be made of metal or another wear-resistant material.

The deflecting lever which may be constructed at its point of attachment so as to be bent by 90° relative to the joint has a substantially rectangular shape; the other end of the deflecting lever projects into a recess of the tie rod and loosely connects the latter with the deflecting lever. In this area, it is advantageous to let the deflecting lever terminate in a pin-shaped elongation.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 3 shows a cross section through the selector handle with a T-shaped element and a connection part;

FIG. 4 is a cross-sectional view along the line IV—IV of FIG. 1;

FIG. 5 is a partial perspective view of the push button mechanism of the present invention;

FIG. 6 is a front view of the embodiment of FIG. 5;

DETAILED DESCRIPTION OF THE PRESENTLY PREFERRED EMBODIMENTS

Figure 1:
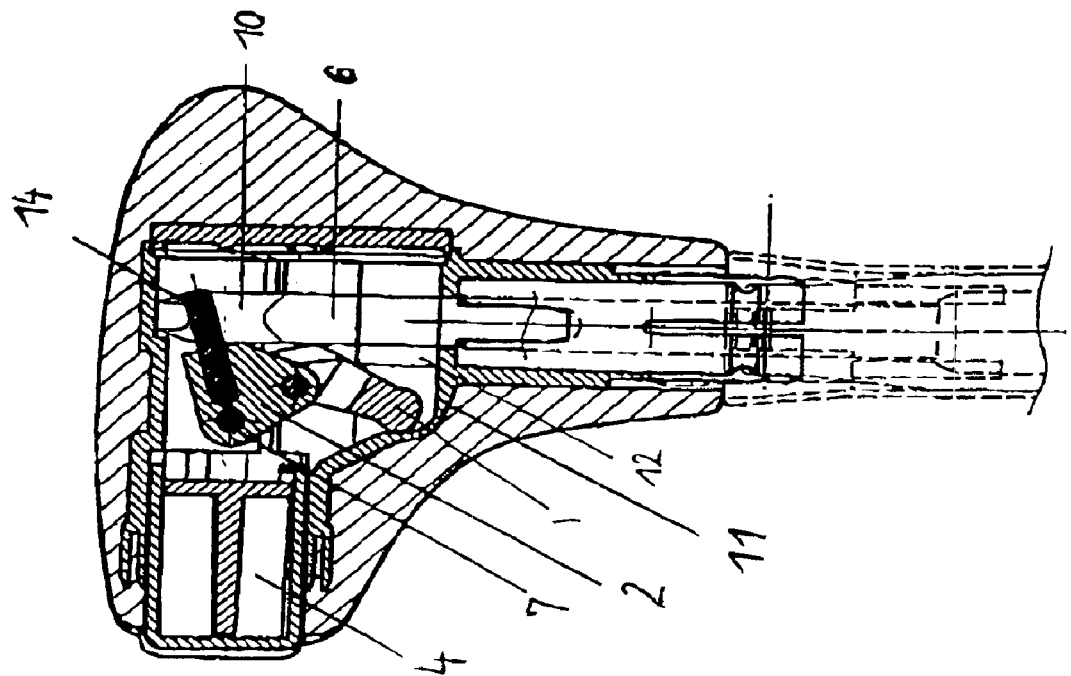
FIG. 1 shows a selector handle with a deflecting mechanism according to the present invention in the "tie rod down" position.
Figure 2:
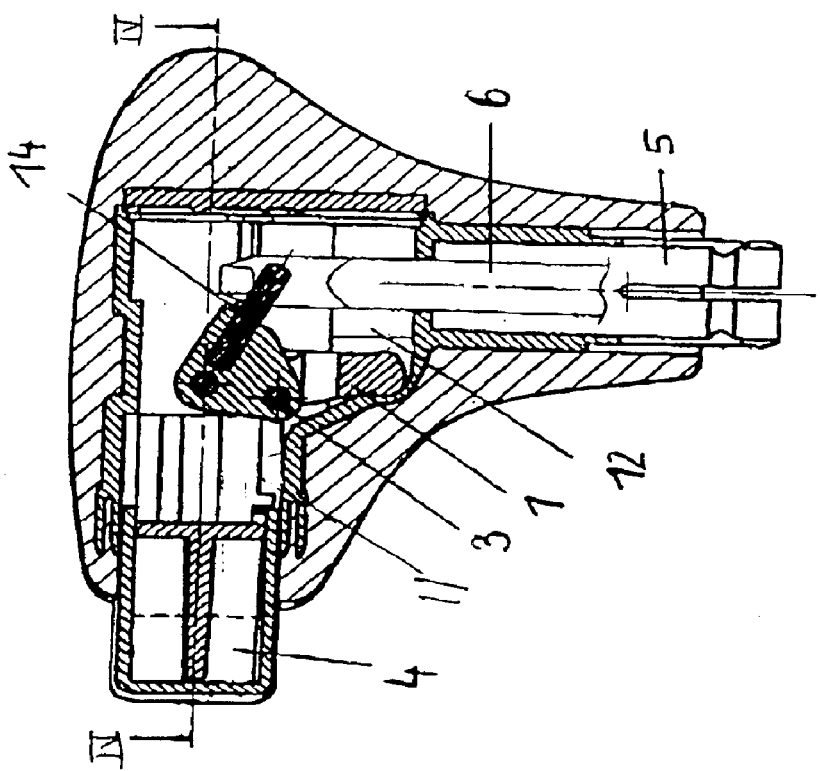
FIG. 2 shows a selector handle with a deflecting mechanism according to the present invention in the "tie rod up" position.
Figure 7:
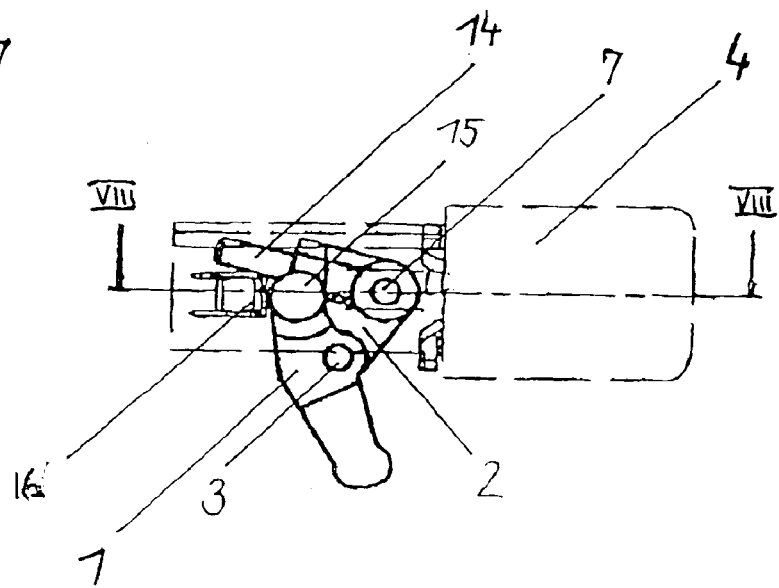
FIG. 7 is a side view of the push button mechanism of the present invention.
Figure 8:
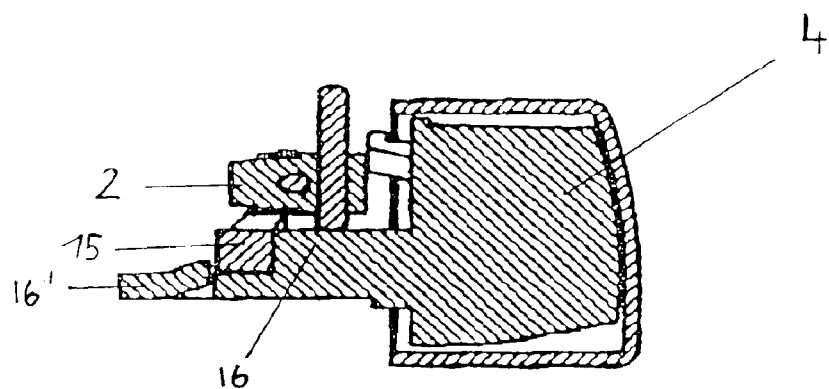
FIG. 8 is a cross-sectional view of FIG. 7 along the line VIII—VIII of FIG. 7.
Figure 9:
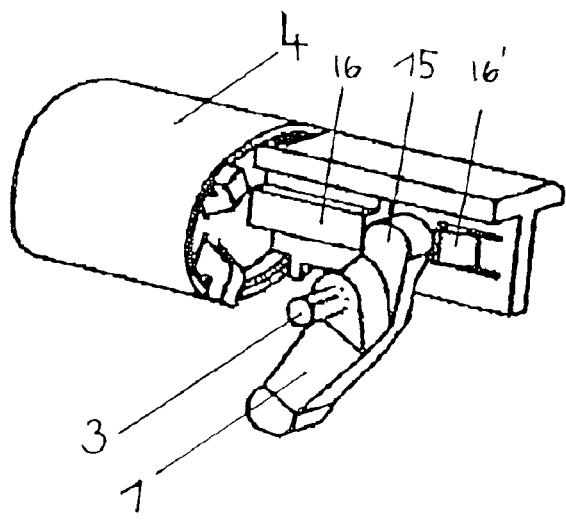
FIG. 9 is a further partial perspective view of the push button mechanism of the present invention.

FIGS. 1 and 4 show a section through the selector handle according to the present invention with a push mechanism at the selector handle of an automobile in which the push button 4 has not yet been pushed into the housing 11, so that the shift or tie rod 6 is pressed downward. Further, a support lever 1 is provided in this embodiment. The push button 4 acts indirectly on the pivot joint which connects the support lever 1 and the deflecting lever 2 with one another by means of a cylindrical pin 3 so that the support lever 1 can pivot with respect to the deflecting lever 2. As shown in FIG. 2, the support lever 1 is supported at its rounded lower end at the housing 11. Its deflection angle is limited by the distance element 12 disposed between the support lever 1 and the tie rod 6.

As also shown in FIG. 2, at the upper end of the deflecting lever 2 is a pin-shaped extension 14 projecting into a window-like recess 10 of the tie rod 6 which is arranged at the upper end thereof. When the push button 4 (FIG. 2) is pressed to move linearly into the housing 11, the joint of the cylindrical pin 3 moves toward the tie rod 6, whereby the deflecting lever 2 is swiveled around the cylindrical pin 7, and the pin-shaped extension 14 contacting the upper part of the recess 10, pulls the tie rod 6 to move linearly upward transversely to the movement of the push button.

The movement of the tie rod 6 is limited by the housing.

FIG. 3 shows a cross section through the automatic selector handle with a connection part 8. In this embodiment, a T-shaped element 13 is guided in the selector handle and transmits the movement of the push button 4 by means of a driver piece 9 to a connection part 8. This connection part 8 transmits the movement onward to the joint of the cylindrical pin 3 which pivots the deflecting lever 2 to move the tie rod 6 up and down.

FIGS. 5–9 show additional details of the push button mechanism of the present invention. As shown, support lever 1 is provided with an upper portion 15 (FIGS. 7–9) which is shaped to engage a driver member 16, 16' of the T-shaped extension of push button 4. The deflecting lever 2 is pivotally mounted to the housing 11 by cylindrical pin 7. Movement of the push button 4 toward tie rod 6 will cause the upper end of support lever 1 to move in the same direction which, in turn, will cause the deflecting lever 2 and its pin-shaped extension 14 to pivot around cylindrical pin 7 due to the moveable pivot connection at pin 3 between the ends of supporting lever 1 and deflecting lever 2 thus causing the tie rod 6 to move in an upward direction.

As will be understood, movement of the push button 4 does not directly act on the joint formed by cylindrical pin 3, but on a point which is located above the pivot point and above cylindrical pin 3 so that there is not a 1:1 translation of the movement of the push button but rather only about 30% of the movement of the push button is translated into movement of the tie rod. In other words, while pivot 7 is fixed, pivot 3 is moveable and movement of the push button and support lever 1 causes the deflecting lever to rotate only about fixed pivot 7.

The invention is not limited by the embodiments described above which are presented as examples only but can be modified in various ways within the scope of protection defined by the appended patent claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A selector handle for shifting gears in an automatic transmission, said handle comprising:

a housing;

a tie rod which is movable linearly in said housing, said tie rod having a recess;

a push button which is movable linearly in said housing transversely to the movement of the tie rod, said push button having a driver member;

a support lever having one end supported by said housing and an opposite end which engages said driver member;

a deflecting lever which is pivotably mounted to said housing, said deflecting lever having an extension which engages said recess in said tie rod; and a movable pivot joint connecting said support lever to said deflecting lever so that said support lever can pivot with respect to said deflecting lever, said joint comprising a cylinder pin between said one end and said opposite end of said support lever, whereby linear movement of said push button causes said support lever to pivot about said one end, which causes said deflecting lever to pivot in said housing, which causes said tie rod to move linearly in said housing.

2. The selector handle of claim 1 wherein said push button further comprises a T-shaped element for guiding the push button linearly.

3. The selector handle of claim 1 wherein said one end of said support element is rounded.

4. The selector handle of claim 1 further comprising a distance element disposed between the support lever and the tie rod for limiting pivoting movement of the support lever.

5. The selector handle of claim 1 wherein said extension comprises a pin.

6. The selector handle of claim 1 wherein movement of said push button translates to movement of said tie rod in a ratio of less than 1:1.

* * * * *